Patented Aug. 23, 1938

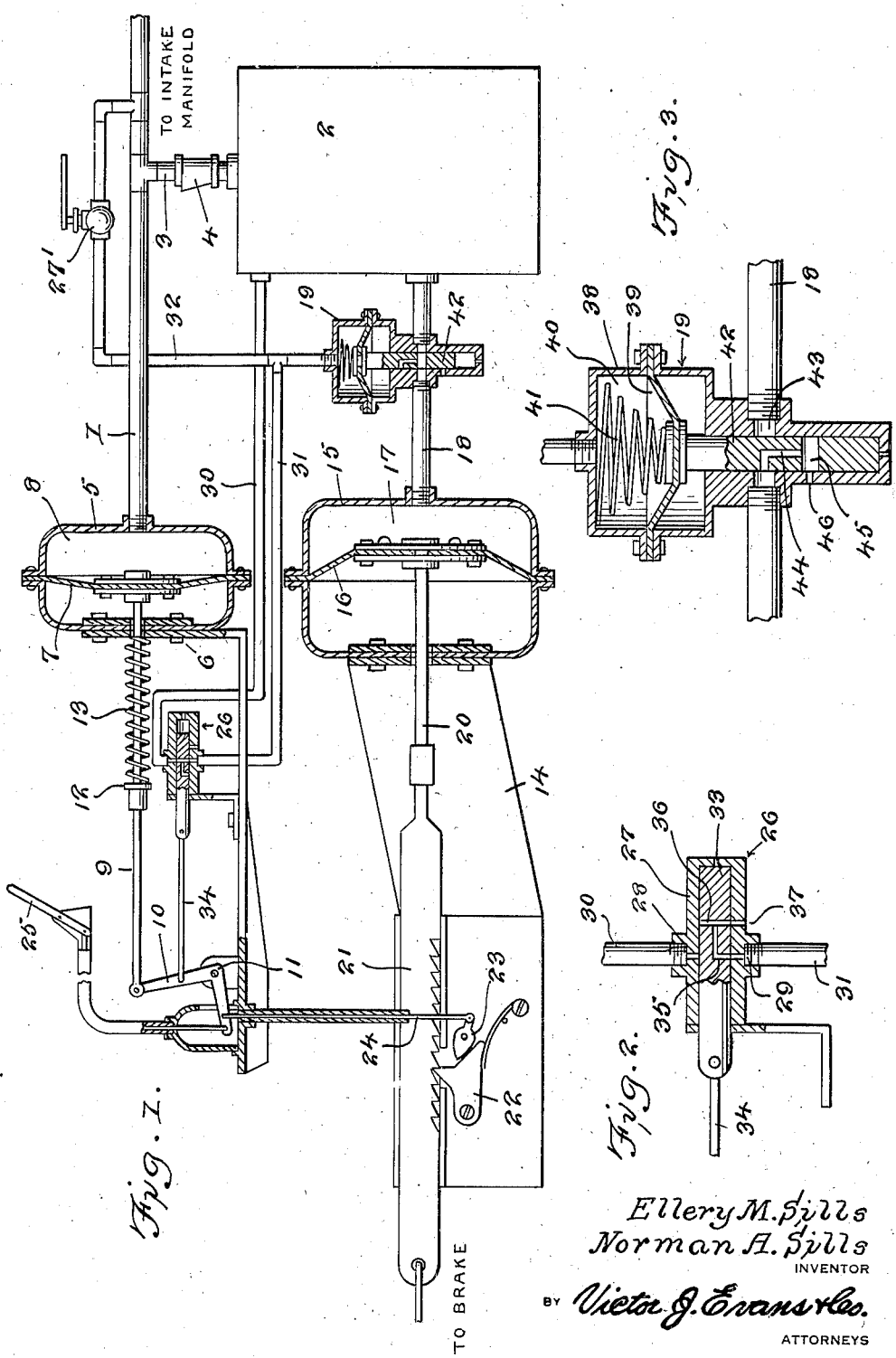

2,127,890

UNITED STATES PATENT OFFICE 2,127,890

AUTOMATIC SAFETY BRAKE DEVICE

Ellery M. Sills and Norman A. Sills, Portland, Oreg.

Application November 17, 1937, Serial No. 175,113

4 Claims. (Cl. 188—152)

This invention relates to automatic safety brake devices and has for the primary object the provision of a device of this character which will assure an instant and complete automatic application of the brakes of a motor vehicle and its trailer should said vehicle be of this type when the engine of the vehicle fails or becomes inoperative from any cause or when it is intentionally stopped for parking or the like.

With these and other objects in view, this invention consists in certain novel features of construction, combination and arrangement of parts to be hereinafter more fully described and claimed.

For a complete understanding of our invention, reference is to be had to the following description and accompanying drawing, in which Figure 1 is a side elevation, partly in section, illustrating an automatic safety brake device constructed in accordance with our invention.

Figure 2 is a fragmentary vertical sectional view illustrating the automatically actuated vacuum controlled valve.

Figure 3 is a fragmentary vertical sectional view illustrating a vacuum actuated valve.

Referring in detail to the drawing, the numeral 1 indicates a main vacuum pipe to be connected to an intake manifold of an engine of a motor vehicle for the purpose of maintaining a partial vacuum therein during the operation of the engine or the pipe 1 may be connected to some other vacuum source (not shown). 2 indicates a reserve vacuum tank connected to the main vacuum pipe 1 by a pipe 3 having therein a check valve 4. A partial vacuum is developed in the reserve vacuum tank 2 by the vacuum developed in the main vacuum pipe 1, and should the vacuum be destroyed from any cause in the main vacuum pipe 1 the check valve 4 acts to prevent the vacuum in the reserve vacuum tank 2 from being destroyed. A diaphragm casing 5 is carried by a support 6 mounted on the motor vehicle and has therein a diaphragm 7 forming in the diaphragm casing 5 a vacuum chamber 8 in direct communication with the main vacuum pipe 1. A rod 9 is secured on the diaphragm 7 and extends out of the casing 5 and is pivoted to one end of a bell crank lever 10, the latter being pivotally mounted on the support 6, as shown at 11. A collar 12 is secured on the rod 9 and forms a seat for one end of a coil spring 13, the other end of the spring seats against the support 6 so that the spring acts to flex the diaphragm 7 in one direction or in the position as shown in Figure 1.

A support 14 is mounted on the motor vehicle or may form a part of the support 6 and carries a diaphragm casing 15 in which operates a diaphragm 16 forming in said casing 15 a vacuum chamber 17 connected to the reserve tank 2 by a pipe 18 having located therein the vacuum operated valve 19. A rod 20 is connected on the diaphragm 16 and a portion thereof which is arranged exteriorly of the casing 15 is in the form of a rack bar 21 slidably supported by the support 14. The rack bar 21 is connected to a brake rigging of the motor vehicle in any well known manner for the purpose of bringing about full application of the motor vehicle brakes when the rack bar is moved to the right in Figure 1 or as shown in said Figure 1. A spring pressed dog 22 is pivotally mounted on the support 14 to engage with the rack bar 21 for securing the latter against sliding movement in a direction to prevent release of the motor vehicle brake. A cam 23 is pivotally mounted on the support 14 and engages with the dog 22 and is connected to one end of the bell crank lever 10, as shown at 24. The cam 23 is for the purpose of disengaging the dog from the rack bar when the bell crank lever is moved into one of its positions freeing the brakes of the motor vehicle for a normal operation.

A hand lever 25 is operatively connected with the bell crank lever 10 for positioning the latter to disengage the dog from the rack bar. The hand lever 25 provides a medium whereby the rack bar 21 may be freed manually when desired.

A control valve 26 is mounted on the support 6 and consists of a housing 27 having ports 28 and 29 to which pipes 30 and 31 are connected. The pipe 30 connects with the reserve vacuum tank 2 while the pipe 31 connects with the pipe 32, one end of which is connected to the valve 19 and the other end connected to the main vacuum pipe 1 between the vacuum source and the pipe 3 and has located therein a manually actuated control valve 27' whereby the valve 19 may be opened and closed to the main vacuum pipe 1 and when in connection therewith will bring about actuation of the brakes by hand control.

The control valve 26 includes a slidable valve element 33 connected to the bell crank lever 10, as shown at 34, and is provided with communicating passages 35 and 36. The housing 27 of the valve 26 has a vent opening 37. The valve element 33 may assume a position to connect the pipes 30 and 31 or may assume a position to vent the pipe 31 to the atmosphere, as shown in Figure 2.

The triple valve 19 consists of a housing 38 in which is located a diaphragm 39 forming a vacuum chamber 40 in the housing. The vacuum chamber 40 is connected to the pipe 32. A coil spring 41 is also located in the vacuum chamber 40 and acts on the diaphragm 39 to flex the same into a position, as shown in Figure 3. A valve element 42 is secured on the diaphragm 39 for controlling ports 43 of the housing 38 to which pipe 18 is connected. The valve element 42 has communicating passages 44 and 45. The valve housing 38 has a vent opening 46. When the vacuum chamber 40 is free of vacuum the coil spring 41 acts to position the valve element 42 to vent the vacuum chamber 17 to the atmosphere. However, when a vacuum is developed in the vacuum chamber 40 the diaphragm 39 is acted on by said vacuum to bring the passage 45 in communication with the ports 43 for connecting the vacuum chamber 17 with the reserve vacuum tank 2.

In operation, a partial vacuum is developed in the main vacuum pipe 1 and the reserve vacuum tank 2 by the running of the engine of the automobile. The partial vacuum in the main vacuum pipe 1 acts on the diaphragm 7 to flex the same to the right in Figure 1, bringing about a movement of the bell crank lever 10 positioning the valve 26 to vent pipe 31 and disengages the dog 22 from the rack bar 21 to permit normal operation of the brakes of the motor vehicle. Also the spring 41 of the valve 17 positions the valve element 42 thereof to vent the vacuum chamber 17 to the atmosphere closing the vacuum reserve tank 2 to the vacuum chamber 17, consequently permitting free flexation of the diaphragm 16 with the normal application and release of the brakes of the vehicle in the usual manner. Should the engine fail from any cause to become inoperative the vacuum in the main vacuum pipe 1 is broken or destroyed and the spring 13 acts to flex the diaphragm 7 into the position as shown in Figure 1 and to position the bell crank, as shown in said Figure 1. The cam 23 assumes a position to permit the dog 22 to engage the rack bar and the valve 26 to communicate the pipes 30 and 31, placing the vacuum chamber 40 of the valve 19 in communication with the reserve vacuum tank 2. The diaphragm 39 is flexed into the position as shown in Figure 1, connecting the reserve vacuum tank 2 with the vacuum chamber 17 so that the vacuum in the reserve vacuum tank acts to flex the diaphragm 16 into the position shown in Figure 1, bringing about a full or complete application of the brakes of the motor vehicle by the rack bar sliding to the right or into a position as shown in Figure 1. The dog 22 holds the rack bar in this position preventing release of the brakes until the engine is again started to create vacuum in the main vacuum pipe 1 or by the release of the dog 22 from the rack bar through the manual operation of the hand lever 25.

A device of the character described and shown in the drawing can be used in conjuction with any type of brake riggings employed upon motor vehicles.

What is claimed is:

1. An automatic safety brake device comprising a main vacuum means connected to a vacuum source, a storage vacuum means connected to said main vacuum means to have a vacuum developed therein by the latter and to maintain said vacuum therein when the vacuum in said main vacuum means is destroyed or interrupted from any cause, a vacuum operated means connected to a brake mechanism and to said storage vacuum means to bring about operation of said brake mechanism for full application of brakes of said mechanism when subjected to the vacuum in said storage vacuum means, said vacuum operated means including a locking means to secure said vacuum operated means in a position for the full application of the brakes, a vacuum actuated valve controlling the communication of said vacuum operated means with said storage vacuum means and normally interrupting said communication, a vacuum actuated lock operating means connected to said main vacuum means and to the locking means to free the vacuum operated means as long as subjected to the vacuum of said main vacuum means and adapted to automatically effect actuation of the locking means to secure the brakes fully applied when free of vacuum by the interruption of the vacuum in the main vacuum means from any cause, and a valve means operated by said vacuum actuated lock operating means and controlling the vacuum from the storage vacuum means to said vacuum actuated valve to bring about actuation of said vacuum operated means for the full application of the brakes when the vacuum in said main vacuum means is destroyed.

2. An automatic safety brake device comprising a main vacuum means connected to an intake manifold of an engine of an automobile, a storage vacuum tank connected to said main vacuum means to have a vacuum developed therein from the source and including means to prevent destruction of the vacuum should the engine fail in operation, a slidably supported rack bar connected to a brake rigging of the motor vehicle, a spring pressed dog engageable with said rack bar to prevent sliding movement of the rack bar in a direction for the release of brakes of said brake rigging, a vacuum casing, a diaphragm operable in said casing and forming therein a vacuum chamber and connected to said rack bar, a valve connecting the vacuum chamber to the storage tank and normally occupying a position to close the vacuum chamber of said casing to the vacuum in the storage tank, a second vacuum casing, a diaphragm operating in the second vacuum casing and forming a vacuum chamber therein connected in direct communication with the main vacuum means, a mechanical construction connected to the second named diaphragm and acting to normally disengage the dog from the rack bar as long as the second named diaphragm is acted upon by a vacuum in the main vacuum means and adapted to permit engagement of the dog with the rack bar when the vacuum in the main vacuum means is destroyed by failure of operation of the engine, and a valved means connected to and controlled by said mechanical construction for controlling vacuum from the storage tank to said first valve and adapted to actuate the latter on the failure of the engine to communicate the storage tank with the first named vacuum chamber to bring about complete application of the brake mechanism due to the sliding of the rack bar by the first named diaphragm.

3. An automatic safety brake device comprising a main vacuum means connected to an intake manifold of an engine of an automobile, a storage vacuum tank connected to said main vacuum means to have a vacuum developed therein from the source and including means to prevent destruction of the vacuum should the engine fail in operation, a slidably supported rack bar connected to a brake rigging of the motor vehicle, a spring pressed dog engageable with said rack bar to prevent sliding movement of the rack bar in a direction for the release of brakes of said brake rigging, a vacuum casing, a diaphragm operable in said casing and forming therein a vacuum chamber and connected to said rack bar, a valve connecting the vacuum chamber to the storage tank and normally occupying a position to close the vacuum chamber of said casing to the vacuum in the storage tank, a second vacuum casing, a diaphragm operating in the second vacuum casing and forming a vacuum chamber therein connected in direct communication with the main vacuum means, a mechanical construction connected to the second named diaphragm and acting to normally disengage the dog from the rack bar as long as the second named diaphragm is acted upon by a vacuum in the main vacuum means and adapted to permit engagement of the dog with the rack bar when the vacuum in the main vacuum means is destroyed by failure of operation of the engine, a valved means connected to and controlled by said mechanical construction for controlling vacuum from the storage tank to said first valve and adapted to actuate the latter on the failure of the engine to communicate the storage tank with the first named vacuum chamber to bring about complete application of the brake mechanism due to the sliding of the rack bar by the first named diaphragm, and a hand controlled lever connected with the mechanical construction to effect release of the dog from the rack bar when desired.

4. An automatic safety brake device comprising a main vacuum means connected to an intake manifold of an engine of an automobile, a storage vacuum tank connected to said main vacuum means to have a vacuum developed therein from the source and including means to prevent destruction of the vacuum should the engine fail in operation, a slidably supported rack bar connected to a brake rigging of the motor vehicle, a spring pressed dog engageable with said rack bar to prevent sliding movement of the rack bar in a direction for the release of brakes of said brake rigging, a vacuum casing, a diaphragm operable in said casing and forming therein a vacuum chamber and connected to said rack bar, a valve connecting the vacuum chamber to the storage tank and normally occupying a position to close the vacuum chamber of said casing to the vacuum in the storage tank, a second vacuum casing, a diaphragm operating in the second vacuum casing and forming a vacuum chamber therein connected in direct communication with the main vacuum means, a mechanical construction connected to the second named diaphragm and acting to normally disengage the dog from the rack bar as long as the second named diaphragm is acted upon by a vacuum in the main vacuum means and adapted to permit engagement of the dog with the rack bar when the vacuum in the main vacuum means is destroyed by failure of operation of the engine, a valved means connected to and controlled by said mechanical construction for controlling a vacuum from the storage tank to said first valve and adapted to actuate the latter on the failure of the engine to communicate the storage tank with the first named vacuum chamber to bring about complete application of the brake mechanism due to the sliding of the rack bar by the first named diaphragm, a hand controlled lever connected with the mechanical construction to effect release of the dog from the rack bar when desired, and a manually controlled means connected to said main vacuum means and to said first valve whereby the latter may be manually actuated to communicate the first named vacuum chamber with the vacuum storage tank for the application of the brakes of the brake mechanism.

ELLERY M. SILLS.
NORMAN A. SILLS.